3,111,416
PROCESS OF EPOXIDIZING PROTEINACEOUS MATERIALS
Kenneth M. Gaver, Preville, Quebec, Eduard G. Adamek, Brockville, Ontario, and Gerhard F. Fink, Montreal, Quebec, Canada, assignors to The Ogilvie Flour Mills Company Limited, Montreal, Quebec, Canada, a corporation of Canada
Filed July 13, 1959, Ser. No. 826,536
4 Claims. (Cl. 106—146)

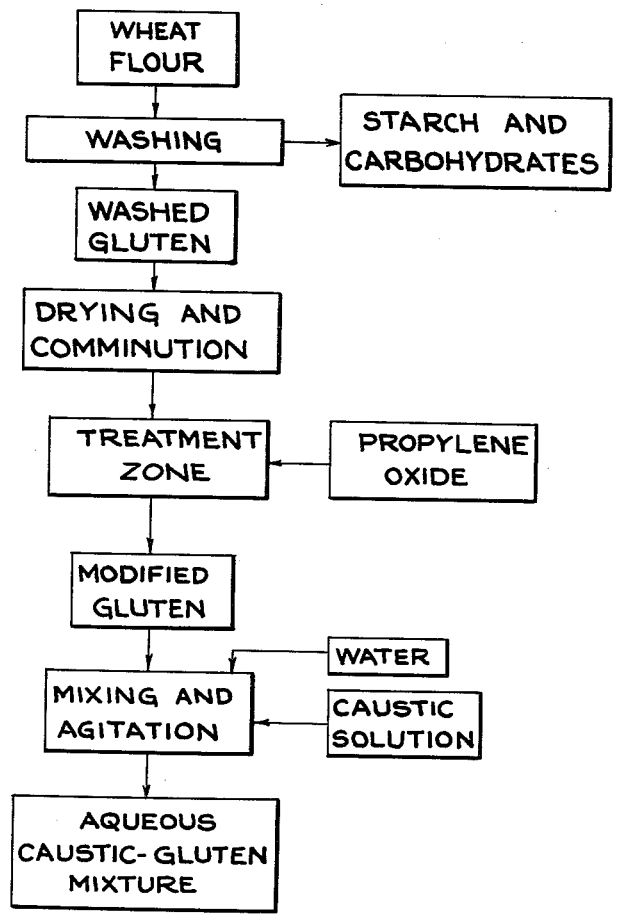

The instant invention relates to the treatment of wheat flour and to the production of novel compositions therefrom. It relates more particularly to the modification of the characteristics of various constituents of wheat flour and to the production of valuable compositions from the modified products.

Various proteinaceous materials are being used commercially as an ingredient in paper coating compositions, adhesive compositions and other compositions used for internal sizing of paper, ore flotation and desliming and the like. However, in the past, it has not been feasible to use wheat flour or wheat gluten as the source of protein in these compositions. For example, the gluten formed a stiff rubbery mass when mixed with the caustic solutions used in various compositions, such as paper coating compositions. Because wheat flour and wheat gluten which is derived from the flour are readily available in commercial quantities, a method for solubilizing or dispersing them in aqueous caustic is desired.

It is therefore an object of the instant invention to provide methods for modifying constituents of wheat flour, such as wheat gluten and for obtaining a smooth viscous liquid from said modified gluten and aqueous caustic.

It is a further object of the instant invention to provide novel compositions for coating paper, wallpaper, offset papers, and the like.

It is a further object of the instant invention to provide methods for modifying certain protein-containing materials, such as wheat gluten, by chemical means in order to alter its properties, and for preparing various compositions from the modified material.

It is a further object of the instant invention to provide a method for epoxidation of constituents of wheat flour thereby altering their character.

These and other objects of the instant invention will become apparent from the description and claims that follow.

We have discovered that epoxidizing agents react with various constituents of wheat flour and alter their character. For example, when certain epoxidizing agents react with wheat gluten, the resulting modified gluten is soluble or dispersible in dilute caustic and becomes suitable for use as an ingredient in a variety of compositions, such as paper coating compositions.

In a specific embodiment of the invention, essentially dry comminuted wheat gluten is exposed to propylene oxide vapor until the weight of the gluten has increased between about 1.5% and about 5.0%. When the resulting propylene oxide-treated gluten is agitated with aqueous caustic soda, for about 15 minutes at an elevated temperature, such as 140° F. a smooth viscous liquid is obtained.

On the other hand, when untreated wheat gluten is agitated with aqueous caustic; a rubbery stiff mass is formed, and there is no substantial change in its appearance even after continued stirring at 140° F. for 40 hours.

FIGURE 1 is a flow sheet showing the steps in the instant method for obtaining modified wheat gluten and for preparing the aqueous caustic mixture from which various coating compositions are prepared.

In practicing this embodiment either "vital" or "devitalized" wheat gluten can be employed. Wheat gluten is derived from wheat flour from which wheat germ and bran have been removed. The gluten is obtained from the flour by washing a dough of the flour with water to remove starch and other carbohydrates. The resulting wet gluten is then dried and comminuted. "Vital" and "devitalized" gluten are prepared and dried at temperatures below 140° F. and above 140° F. respectively. Gluten comminuted to a mesh size between about 60 and about 200 can be used; however, a mesh size of about 100 is generally employed.

The dry gluten is placed in a container, such as a desiccator, and the air in the container is preferably removed prior to introduction of the propylene oxide vapor. The gluten is then contacted with propylene oxide vapor, preferably until the weight of the gluten has increased at least between about 1.5% to about 5%. This generally takes between about 12 and about 72 hours depending upon the conditions employed. The greater the amounts of propylene oxide taken up by the gluten, the lower the viscosity of the caustic mixture obtainable therefrom and the easier it is to obtain a smooth liquid mixture of the gluten and aqueous caustic. Under any given set of conditions a thinner and smoother liquid is obtained from "vital" gluten than from "devitalized" gluten.

To obtain a satisfactory modified gluten, it is important that the gluten be essentially dry (less than about 5% moisture) before the propylene oxide vapor is introduced and that water is not introduced into the system during the treatment with propylene oxide.

Although it is preferred that the gluten be exposed to propylene oxide vapor in the absence of air because air is a diluent for said oxide, a degree of modification occurs even when carried out at atmospheric pressure and in the presence of air, although the aqueous caustic-gluten mixture prepared from it is less smooth and is more viscous. Higher viscosity was also observed when liquid propylene oxide was employed rather than its vapor. In practicing the instant epoxidation, the gluten is preferably exposed to the vapor of the epoxidizing agent.

The modified gluten is mixed with aqueous caustic such as sodium hydroxide or potassium hydroxide preferably sodium hydroxide, to obtain a slurry containing up to about 25% solids, but preferably between about 15% and about 20% solids by weight of gluten and between about 4% and about 5% by weight sodium hydroxide. The slurry is then agitated until it becomes smooth. The agitation can be carried out either at room temperature or at an elevated temperature up to about 140° F. At room temperature, the desired smooth liquid is obtained after about 5 hours of stirring, while at about 140° F., only about 10 to 15 minutes are required to obtain a smooth liquid.

The resulting liquid preferably having a pH between about 10 and about 11 is suitable for use in a number of otherwise conventional type compositions containing a proteinaceous ingredient, such as compositions for coating writing paper, offset paper, wallpaper, and the like.

In a continuous embodiment of the invention, the gluten is transported on a conveyor belt through a chamber countercurrent to a stream of propylene oxide vapor. By regulating the speed of the conveyor and the length of the chamber, the amount of propylene oxide taken up by the gluten can be controlled. By using a slow conveyor speed and an elongated tubular chamber from which air and moisture is substantially absent, a maximum amount of propylene oxide is taken up by the gluten.

Although propylene oxide is the epoxidizing agent responsible for the modification of the gluten in the above specific embodiment of the invention, the instant invention is not limited to the use of propylene oxide. Epoxides in general are capable of reacting with gluten, glutenin, and other constituents of wheat flour. For example, ethylene oxide, butylene oxide, and styrene oxide are also epoxidizing agents. Although all of these epoxidizing agents or mixtures thereof react with the gluten and change its character, the products of gluten and the various epoxides do not necessarily have the same characteristics. For example, the properties of the modified gluten such as its solubility in aqueous caustic varies when different epoxides or mixtures of epoxides are used to modify the gluten. When ethylene oxide vapor and/or propylene oxide vapor are used as the epoxidizing agents, the aqueous caustic mixture prepared from the modified gluten is less viscous than when isobutylene oxide vapor is used. Although styrene oxide vapor reacts with the gluten and modifies its character the product is not soluble in aqueous caustic.

In general, the more hydrophobic the epoxide used, the less the solubility of the resulting condensation product in aqueous solution, and vice versa. Mixtures containing more than one epoxide can be used to modify the gluten, the proportions to be varied according to the properties desired in the modified product.

The instant epoxidation method is also applicable to alter the properties of other protein-containing materials, such as, soy protein, casein, wheat flour, and the like. We know there is immediate commercial importance for gluten which has been modified with epoxides such as propylene oxide and/or ethylene oxide; because unlike the conventional gluten, the instant modified gluten can be dispersed in aqueous caustic and therefore can be used in conventional type compositions in which soy protein and casein are presently employed and in which conventional gluten could not be employed.

In order to more fully illustrate the instant invention but with no intention of being limited thereto, the following specific examples and typical illustrations are given.

*Example I*

Comminuted essentially dry wheat gluten was placed in a desiccator from which air was removed by suction. A container of liquid propylene oxide was connected to the desiccator, and the propylene oxide vapor expanded into the vacuum. The gluten was exposed to the vapor for about 24 hours at room temperature. The amount of propylene oxide absorbed by the gluten was about 2% by weight.

A 30 gm. portion of the treated gluten was stirred at room temperature in 100 ml. water. Then 20 ml. aqueous caustic containing 1.35 gm. sodium hydroxide was added to the gluten slurry yielding a slurry 20% by weight solids. After stirring the resulting mixture for about 5 hours, a smooth, viscous liquid having a pH of about 10.5 was obtained.

*Example II*

A smooth liquid containing caustic and modified gluten was prepared by the same method as in Example I, except that the alkaline slurry containing the propylene oxide-treated gluten was agitated at a temperature of about 140° F. instead of at room temperature. At this elevated temperature, a smooth viscous liquid was obtained in between 10 and 15 minutes. When the resulting mixture containing the gluten cooled to room temperature, its appearance did not change substantially, and it remained free flowing.

On the other hand, when a 20% solids by weight caustic slurry was prepared in the same manner except gluten which had not been treated with propylene oxide was used; within two minutes a rubbery stiff mass formed which did not change substantially even after stirring at 140° F. for about 40 hours.

For this it is obvious that modification of wheat gluten is essential so that a smooth liquid can be obtained when gluten is mixed with aqueous caustic. The instant wheat gluten-aqueous caustic mixtures compare very favorably with those of other protein materials used as ingredients for coating compositions and the like. For example, when alpha soy protein was treated with sodium hydroxide solution in the same manner, a smooth solution was obtained in about 15–20 minutes; however, upon cooling to room temperature a smooth jelly formed.

*Example III*

Air was removed by suction from a desiccator containing gluten, and a flask of liquid propylene oxide was connected to the desiccator. The propylene oxide expanded into the vacuum. After about 15 hours, the connection was broken, and the desiccator evacuated by suction. A flask containing liquid propylene oxide was again connected to the desiccator. By repeating the above procedure three times, a thoroughly treated gluten with a weight increase of about 5% is obtained.

*Example IV*

Dried wheat gluten was placed in a desiccator from which air was removed, and ethylene oxide vapor was allowed to react with the gluten at 3° C. for about 36 hours using the technique described in Example I. The resulting epoxidized product dissolved in dilute alkali (4.5% based on the gluten) at 140° F., and a yellow, smooth solution of relatively low viscosity was obtained. The viscosity changed only slightly upon cooling to room temperature.

The same procedure was carried out for treating gluten with isobutylene oxide at 35° C. The resulting product was dispersed in dilute alkali, and a thick, smooth liquid was obtained after stirring for about 30 minutes at 140° F.

*Example V*

Glutenin, which was recovered from wet gluten from which the gliaden had been separated, was dried at about 135° F. in vacuo. The dried glutenin was subjected to epoxidation with propylene oxide vapor, and the propylene oxide-treated glutenin was dispersed in dilute alkali (4.5% sodium hydroxide based on the weight of glutenin) in the manner described in Example II. A thin, smooth gel formed showing that the glutenin, which normally forms only a heterogeneous slurry with dilute sodium hydroxide, had been modified by the treatment with propylene oxide.

*Example VI*

A wallpaper coating composition was prepared from the aqueous caustic mixture of propylene oxide-treated gluten obtained in Example II by mixing the following ingredients at room temperature:

Aqueous mixture of caustic and modified gluten _____ gm__ 17.5
White china clay _____ gm__ 100
Calgon (sodium hexametaphosphate) _____ gm__ .25
Ammonia _____ gm__ .75
Latex (i.e., butadiene-styrene latex) _____ gm__ 17.5
Defoamer (i.e., pine oil) _____ gm__ .23
Preservative (i.e., o-phenylphenol) _____ gm__ .025
Water _____ ml__ 90

The resulting composition was applied to wallpaper with a film applicator, about .0035 inch thick, and the coated paper was dried at 180° F. The resulting coating was brushed with a concentrated alum solution having the following composition:

Gm.
Aluminum sulfate, $(Al_2(SO_4)_3 \cdot 18H_2O)$ _____ 20
Buffering agents (i.e., sodium acetate and sodium borate, $Na_2B_4O_7 \cdot 5H_2O$) _____ 6.1
Water _____ 400

The alum impregnated coating was then dried. The properties of the resulting coated wallpaper compared very favorably with the corresponding product prepared from alpha soy protein.

*Example VII*

A paper coating was prepared which had improved coating characteristics as compared with the corresponding product prepared from casein rather than modified gluten. The composition contained:

Instant aqueous caustic-modified gluten mixture
gm__ 100
White china clay _____gm__ 100
Calgon (sodium hexametaphosphate) _____gm__ .02
Hexamethylene tetramine _____ml__ 1.4
Water _____ml__ 169

These ingredients were mixed at room temperature, applied to paper with a film applicator in .001–.002 inch thickness, and dried for about 10 minutes at 180° F. This composition gives a smooth, white and uniform paper coating of high quality.

*Example VIII*

Several adhesives were prepared by grinding together the ingredients given below which react when one part of the mix is admixed with two parts water and allowed to stand for thirty minutes. Proportions of ingredients are altered to produce compositions of low or high viscosity i.e. 7300 cps. and 10,300 cps. respectively. Variations are obtained by changing the amount of sodium fluoride and of calcium hydroxide used.

| Ingredient | Parts in Low Viscosity Composition | Parts in High Viscosity Composition |
|---|---|---|
| Vital gluten containing 3% propylene oxide | 1000 | 1000 |
| Calcium hydroxide | 70 | 120 |
| Sodium fluoride | 10 | |
| Second clear flour | 40 | 40 |
| Inert extender | 30 | 30 |
| Boiled linseed oil | 5 | 5 |

In addition to the typical compositions given in the above examples, the instant novel modified gluten product is a suitable substitute for casein and soy protein in a large number of similar coating compositions, as well as in adhesives, textile sizing compositions, paint additives and fillers, plastics, rubbers, drill fluids, and the like where casein, alpha protein, soy protein, and other products are now employed.

Because we have been able to modify gluten and disperse it in aqueous alkaline medium in concentration up to and including 25% solids by weight, a new source of proteinaceous material which is suitable for a large number of commercial applications becomes available. Heretofore, casein and alpha soy protein were the principal sources of protein material for coatings, etc. Now we have provided a method for chemically modifying gluten so that it can be used to obtain compositions as good as or better than those currently produced.

Having thus fully described and illustrated the character of the instant invention, what is desired protected by Letters Patent is:

1. A method for treating wheat gluten to produce a modified gluten suitable for use as the protein ingredient in protein-containing coating compositions, which comprises contacting dried gluten of between about 60 and about 200 mesh size with an epoxidizing agent selected from the group consisting of ethylene oxide, propylene oxide, isobutylene oxide, and mixtures thereof in a substantially anhydrous system, at a temperature between about 3° C. and about 35° C. until the weight of said gluten has increased between about 1.5% and about 5%.

2. The process of claim 1, wherein the epoxidized gluten is dispersed in an aqueous alkaline medium by mixing with water and then with aqueous caustic in amount yielding a slurry between about 15% and 25% solids and containing between about 4% and about 5% caustic based on the weight of the gluten, and the resulting slurry is stirred from between ¼ to 5 hours at a temperature between about room temperature and about 140° F.

3. A process for treating wheat gluten to produce a modified gluten dispersible in aqueous caustic soda for use as the protein ingredient in conventional type protein-containing compositions, which comprises contacting dried wheat gluten of between about 60 and about 200 mesh size with the vapor of an epoxidizing agent selected from the group consisting of ethylene oxide, propylene oxide, isobutylene oxide, and mixtures thereof, in a substantially anhydrous air-free system at a temperature between about 3° C. and about 35° C. for between about 12 and about 72 hours.

4. A method for treating protein-containing materials to obtain substances having modified properties which comprises contacting essentially dry protein material selected from the group consisting of wheat gluten, glutenin, casein, and soy protein, and of between about 60 and about 200 mesh size with vapor of an epoxidizing agent selected from the group consisting of ethylene oxide, propylene oxide, isobutylene oxide, and mixtures thereof in a substantially anhydrous system at a temperature between about 3° C. and about 35° C. for between about 12 and about 72 hours.

References Cited in the file of this patent

UNITED STATES PATENTS

| | | |
|---|---|---|
| 962,498 | Dunham | June 28, 1910 |
| 2,461,070 | McKinney | Feb. 8, 1949 |
| 2,736,663 | Weber | Feb. 28, 1956 |
| 2,797,212 | Miley et al. | June 25, 1957 |
| 2,810,655 | Dean | Oct. 22, 1957 |
| 2,882,250 | Baker | Apr. 14, 1959 |
| 2,933,406 | Salzberg et al. | Apr. 19, 1960 |
| 2,937,104 | Stephen | May 17, 1960 |
| 3,017,375 | Gehring | Jan. 16, 1962 |
| 3,058,835 | Sheeran | Oct. 16, 1962 |